United States Patent Office 2,866,710
Patented Dec. 30, 1958

2,866,710

COATED SAUSAGE CASING

Laurence E. Dowd, Chicago, and Milton A. Glaser, Winnetka, Ill., assignors to Tee-Pak, Inc., Chicago, Ill., a corporation of Illinois No Drawing. Application July 13, 1955
Serial No. 521,890

11 Claims. (Cl. 99—176)

This invention relates to coated film material in the form of sheets, tubes and the like, and more particularly to coated regenerated cellulose film in sheet or tube form, having new and unusual attributes and utility.

While the use of regenerated cellulose film as a wrapping or packaging material is widespread due to the great number of desirable qualities which this material has for this purpose, there are conditions under which regenerated cellulose film does not perform satisfactorily. This is particularly so where the conditions of use are such that the wrapping material must be concurrently moisture-proof, stretchable and unaffected by contact with water.

While improvements in expanding the degree of utility of regenerated cellulose film have been achieved to a marked degree by the application to the film surface of coatings of one kind or another, such coated films still lack some characteristics which would make them better suited for certain purposes. Thus regenerated cellulose films which have been coated with lacquers, alkyd resin compositions of one kind or another will not stand stretching particularly when accompanied by contact with water. With such coated films stretching, particularly in the presence of water, and at elevated temperatures results in a loosening, separation or sloughing off of the coating from the film surface.

The film of the present invention is a substantial improvement over the prior art in that it provides a moisture and moisture vapor resistant wrapping or packaging film material in the form of a sheet, tube or the like which is not only stable in the presence of wet materials but which combines its moisture-proofness with excellent printability and whose moisture vapor permeability characteristics are unaffected by exposure of the film to elevated temperatures.

An important, but by no means exclusive embodiment of the present invention is provided in the form of a composite seamless tube consisting of a regenerated cellulose film base having a coating bonded thereto for use as an encasing material for sausage and the like, particularly where the encased product is to be processed by cooking.

The present invention is particularly useful in the production of liver sausages, wieners, and similar types of soft sausages which, in their processing, are cooked, smoked or otherwise heat treated.

In making liver sausage, for example, a casing of suitable length is tied at one end with clips, metal bands, string and the like and the casing is soaked in water at about 120–130° F. for 20 to 30 minutes. The casing is then stuffed under pressure with suitably prepared liver sausage emulsion, the stuffing being carried out to the point where the casing becomes stretched to the desired diameter. This increase in diameter may be of the order of 15–50%. The other end of the stuffed casing is then tied in the same manner as heretofore described and the resulting sausage is cooked by immersion in a suitable tank for about 3 hours at 160–180° F. The cooked sausage is then removed from the vat, wiped off and hung by one end at reduced temperatures for a sufficient time to lower the internal temperature of the encased sausage emulsion to about 34–40° F. The liver sausage is then ready for use.

The use of the prior art coated regenerated cellulose castings in the production of liver sausage as exemplified in the above procedure has not been successful, because under the processing conditions described above the coating invariably cracks, peels or sloughs off in process. And because the requirements for a liver sausage casing are even more exacting than for casings to be used as containers for such items as hams and luncheon loaves, which type of casing has been described in the copending application of Laurence E. Dowd, Serial No. 208,672, filed January 30, 1951, now U. S. Patent No. 2,627,483, even the latter type of casing has not been found entirely satisfactory for the production of liver and similar sausage. That is to say that even with the improved casing described in the aforesaid copending application the processing treatment involved in the production of liver sausage and similarly produced sausage results in a subsequent increase in the moisture vapor permeability of such casing.

Because of the high cooking temperatures employed in producing liver sausage, it is imperative that a completely successful casing must not only possess those attributes of stretchability and adhesion which characterize the product described in the aforesaid copending application, but it must retain a high degree of impermeability after the cooking has been effected. One reason for this requirement is that liver sausage, due to its composition, has a much greater tendency to lose moisture than do other types of meat items, such as ham and luncheon loaves. In fact, with hams and luncheon loaves a certain degree of moisture vapor permeability is desirable in order for the product to maintain its appearance of freshness. With liver sausage on the other hand, it is a desideratum that the casing used be so unaffected by the "in process" treatment, namely, cooking, stretching, stuffing and the like, that it retains it impermeability to moisture and moisture vapor after the processing is completed.

Besides minimizing the degree of shrinkage or moisture loss which the present casing accomplishes for liver sausage, it has certain other desirable characteristics. For example, the use of the present casing results in a substantial elimination of discoloration of the liver sausage and the elimination of the formation of a hard crust around the outer surface of the sausage; additionally, the present casing results in elimination of shrivelling such as characterizes many prior art casings.

Another attribute of the present composite casing is that it may be printed directly after the coating which has been applied thereto has dried. With wax-containing coatings on the other hand, it has been necessary to treat the coated film in one way or another to prepare the surfaces thereof for the receipt of printed images.

Accordingly, it is one object of the present invention to provide a composite regenerated cellulose film which may be exposed to high temperatures without losing its low vapor permeability at temperatures as low as those used in food freezing operations.

It is another object of the present invention to provide a composite regenerated cellulose film which has a low vapor permeability through a wide temperature range.

A further object is to provide a coated regenerated cellulose film product which may be wetted and stretched without lifting off of the coating from the regenerated cellulose film surface in the presence or absence of water, which may be printed with oil based inks without treatment of the coated surface of aniline, and which retains its moisture vapor permeability characteristics over a wide temperature range. A further object is to prepare a sausage casing in the form of a seamless tube of regenerated cellulose film which is particularly suitable as an "in process" as well as "end use" casing for liver sausages.

In accordance with the present invention a mixture of certain polymerizable resins, and a substantially water insoluble polymeric moisture proofing material is applied uniformly to the surfaces of a regenerated cellulose film and then cured by heating in air or by other suitable methods to effect a binding of the coating to the surface of the regenerated cellulose film.

The coating composition may comprise a mixture of unsaturated ester compositions formed by first reacting together bis-phenol and epichlorhydrin as set forth for example in U. S. Patent No. 2,456,408, and then further reacting the resulting polymeric polyhydric alcohol with drying oils, drying oil fatty acids or mixtures thereof, admixing such materials as solvents, dryers, accelerators and the like, and also adding, as an essential component a substantially water insoluble polymeric moisture proofing material such as a polymer of ethylene preferably in dispersion form, rubbery materials including both natural and synthetic rubbers, rubber-like materials like the high styrene-butadiene copovlmer manufactured under the trade-name of Pliolite S–5, cyclized rubbers, and similar compatible non-waxy moisture proofing compounds.

The above coating mixture may be applied to the surface of regenerated cellulose film by spraying, dipping, brushing or printing and, after application, heated until the coated film has dried to a tack-free condition.

The ester product which is one of the essential ingredients used in preparing our novel composite regenerated cellulose film, which conveniently prepared by reacting drying oils with polyhydric alcohols from bisphenol and epichlorhydrin, may consist more generally of any higher fatty acid esters of polymeric polyhydric alcohols, which alcohols may be prepared in a manner known to the art from polyhydric phenols with polyhalo alcohols, epihalohydrins or polyepoxy compounds. The preferred polyhydric alcohol which has been used successfully is a commercially available epichlorhydrin-bisphenol resin having a melting point of about 95 to 105° C. and an equivalent weight of about 174. The fatty acid component of the coating composition is preferably a mixture of linseed and oiticica oil fatty acids.

Various ingredients, as hereinbefore mentioned, can be used as the moisture proofing agents in preparing the novel coated articles of this invention. Where ethylene polymer is used as the moisture proofing medium, it may be used in the form of a dispersion. Such a polymer is a commercially available material and is represented, for example, in U. S. Patent No. 2,518,462 to Gowing et al., as a polymer of ethylene which is solid at room temperature, has a composition corresponding to $(CH_2)_x$ and shows a crystalline structure by X-ray diffraction.

Where a rubbery material like the high styrene-butadiene polymer represented by Pliolite S–5 is used, it is conveniently incorporated with the other components of the coating composition in the form of a solution.

The nature and preparation of the composite regenerated cellulose base articles of this invention will be further illustrated by the following.

Example 1

A. 662 pounds of epichlorhydrin bis-phenol resin having a melting point of about 95° C. and an equivalent weight of about 174, 394 pounds of linseed oil fatty acids, and 144 pounds of oiticica oil fatty acids are heated slowly to 475° F. Agitation is started as soon as the batch is molten, that is, at about 300° F. When the product is at such a state that a cold pill on glass is clear, the material is sparged with nitrogen and held until the acid number if less than 4 and the viscosity is U (Gardner Scale) at 77° F. on the solution. The product is then reduced with 810 pounds of VM and P naphtha and 810 pounds of xylene. 740 pounds of the above material is then treated with 95 pounds of n-butanol, 1⅞ pounds of 6% cobalt naphthenate and ⅞ pound of 5% calcium naphthenate.

B. The ethylene polymer dispersion to be added to the above is prepared as follows:

Ten parts of ethylene polymer in powder or flake form having the characteristics hereinbefore referred to, and 19 parts of xylene or similar aromatic solvent are mixed together. The mixture is then heated to about 220° F. until the ethylene polymer is in apparent solution, that is until it is reasonably clear. While the material is still hot it is loaded into a pebble mill and pebbled. As the solution cools the particles are deposited. The mixture is pebbled for about 16 hours at which time it has a loose gel structure.

In making up the coating composition to be applied to the regenerated cellulose film, sufficient ethylene polymer dispersion is added to the product described in A above, so that the resulting mixture, based on solids, contains from about 0.5% to 13%, preferably within the range of either 0.5% to 1.5% or 6.5% to 9.5% of the polyethylene polymer.

There is also added sufficient diluent, which can be xylol, VM and P naphtha or other organic solvents, to reduce the solids content to a proper coating viscosity, for example, to about 28%. The mixture of ethylene dispersion and the previously prepared resinous composition is mixed thoroughly, and is then applied to the surface of the regenerated cellulose film being coated at room temperature and cured at 250° F. for two minutes, the amount applied being sufficient to produce a film thickness of about 0.2 mil. The finished coated film is ready for use.

Example 2

A. 1084 pounds of epichlorhydrin bisphenol resin having a melting point of about 95° C. and an equivalent weight of about 174, 645 pounds of linseed oil fatty acids, 233 pounds of oiticica oil fatty acids, and 39 pounds of dimer acids are heated slowly to 475° F. Agitation is started as soon as the batch is molten, that is, at about 300° F. When the product is in such a state that a cold pill on glass is clear, the material is sparged with nitrogen and held until the acid number if less than 5 and the viscosity is U–V (Gardner Scale at 77° F. on the solution). The product is then reduced with 1081 pounds VM and P naphtha and 1622 pounds xylene. 740 pounds of the above material is then treated with 95 pounds of n-butanol, 1⅞ pounds of 6% cobalt naphthenate and ⅞ pound of 5% calcium naphthenate.

B. 170 pounds of milled Pliolite S–5 is dissolved with agitation in 678 pounds of xylene.

In making up the coating composition to be applied to the regenerated cellulose film, sufficient butadiene styrene-copolymer, as Pliolite S–5, is added to the product described in A above, so that the resulting mixture, based on solids contains from about 2.0% to 14.0% preferably within the range of 7.0% to 10.0% of the butadiene-styrene copolymer.

An important form or embodiment of this invention is obtained by applying the above described coating composition to a plasticized regenerated seamless tube, i. e. a sausage casing, made in known manner as set forth for example in United States Patents Nos. 1,601,686; 1,937,225; 1,997,349; and 2,013,491.

Comparative tests on the storage characteristics of liver sausages processed while encased in regenerated cellulose casings prepared in accordance with this invention and with various other types of treated and untreated regenerated cellulose casings have clearly demonstrated the superiority of the present casings, the latter being the only ones which resulted in maintenance of controlled low moisture-vapor permeability after processing of the liver sausages. Furthermore the present sausage casings evidenced no loosening, peeling, or sloughing off of the coating from the regenerated cellulose film surface.

Another embodiment of the present invention is represented by regenerated cellulose film in sheet form treated by bonding a coating of the hereinbefore described type thereto, to provide a wrapping or packaging material for products which are to be shipped to and/or stored in tropical countries under conditions of high temperature and humidity. Such wrapping or packaging material can be used to keep dry materials dry and moist materials moist, even under such extreme and punishing treatment as stretching and wetting the sheet material, and subjecting it to hot or boiling water as well as to sub-freezing temperatures.

Another embodiment of this invention is represented by what is known in the trade as fibrous sausage casing, composed of regenerated cellulose reinforced with fibers of cellulose, which has been treated by bonding to the surfaces thereof a coating of the type hereinbefore described.

While the coated articles of the present invention are eminently useful as packaging, wrapping, and encasing materials without further modification, they may of course be modified by applying other coating thereto, such as heat sealing lacquers, light-barrier compounds and the like. Furthermore opacifiers such as titanium dioxide and color imparting pigments may be added to the aforesaid coating mixtures.

And while the present invention has been described as embodied in certain preferred forms, it is to be understood that these are illustrative and that modification thereof will readily occur to those skilled in the art.

This case is a continuation-in-part of our copending application, Serial No. 325,436, filed December 11, 1952, now abandoned.

We claim:

1. A sausage casing comprising a regenerated cellulose film coated with a continuous film formed by applying to the surface of said face a liquid mixture comprising the reaction product of (A) a polyhydric phenol and a member of the group consisting of polyhaloalcohols, epihalohydrins and the polyepoxy compounds, and (B) a material selected from a group consisting of drying oils, drying oil fatty acids, and mixtures thereof, and as a moisture proofing ingredient from about 2.0% to 14.0%, based on solids content of the coating material, of a butadiene-styrene copolymer.

2. A sausage casing comprising a regenerated cellulose film coated wtih a continuous film formed by applying to the surface of said face a liquid mixture comprising the reaction product of (A) a polyhydric phenol and a member of the group consisting of polyhaloalcohols, epihalohydrins and polyepoxy compounds, and (B) a material selected from a group consisting of drying oils, drying oil fatty acids, and mixtures thereof, and as a moisture proofing ingredient a butadiene-styrene copolymer, the said copolymer being present in the amount of about between 2.0% to 14.0% based on the solids content of the coating material.

3. A composite moisture and moisture vapor resistant flexible sheet material comprising a regenerated cellulose film coated with a continuous film formed by applying to the surface of said face a liquid mixture comprising the reaction product of (A) a polyhydric phenol and a member of the group consisting of polyhalo alcohols, epihalohydrins and polyepoxy compounds, and (B) a material selected from the group consisting of drying oils, drying oil fatty acids, and mixtures thereof, and as a moisture proofing ingredient from about 0.5% to 14% based on solids content of the coating material, of a substantially water insoluble polymeric material.

4. The article of claim 3 wherein the sheet material is in the form of a seamless tube.

5. The article of claim 3 wherein the sheet material to be coated is in the form of a tube of regenerated cellulose reinforced with fibers.

6. A composite moisture and moisture vapor resistant flexible sheet material comprising a regenerated cellulose film coated with a continuous film formed by applying to the surface of said face a liquid mixture comprising the reaction product of (A) a polyhydric phenol and a member of the group consisting of polyhaloalcohols, epihalohydrins and polyepoxy compounds, and (B) a material selected from a group consisting of drying oils, drying oil fatty acids, and mixtures thereof, and from about 0.5% to 13%, based on solids content of the coating material, of an ethylene polymer having a composition corresponding to $(CH_2)_x$ and which shows a crystalline structure by X-ray diffraction.

7. The article of claim 6 wherein the film material is in the form of a seamless tube.

8. A substantially stretchable moisture and moisture vapor resistant packaging material whose moisture vapor permeability characteristics are substantially unaffected by exposure to elevated temperatures such as are encountered in cooking comprising a regenerated cellulose tube having bonded to the surface thereof a thin continuous coating formed by (1) first applying to said surface a film of a material formed by reacting (A) the reaction product of a polymeric polyhydric alcohol and (B) a member selected from the group consisting of drying oils, drying oil fatty acids, and mixtures thereof, and containing from about 0.5% to 13%, based on solids, of an ethylene polymer which is solid at room temperature has a composition corresponding to $(CH_2)_x$ and shows a crystalline structure by X-ray diffraction, and (2) heating said tube to polymerize and concurrently bond said material to said surface.

9. The product of claim 8 wherein the said coating material contains about 0.5% to 1.5% of the said polyethylene polymer based on the solids content of said coating material.

10. The product of claim 8 wherein the said coating material contains about 6.5% to 9.5% of the said ethylene polymer based on the solids content of said coating material.

11. The product of claim 8 wherein the said drying oil fatty acid esters comprise oiticica fatty acid esters.

References Cited in the file of this patent

UNITED STATES PATENTS

| | | |
|---|---|---|
| 2,456,387 | Cooper | Dec. 14, 1948 |
| 2,456,408 | Greenlee | Dec. 14, 1948 |
| 2,627,471 | Dowd | Feb. 3, 1953 |
| 2,627,483 | Dowd | Feb. 3, 1953 |

OTHER REFERENCES

"India Rubber World," October 1952, pp. 80 to 84, inclusive.